(12) United States Patent
Hadar et al.

(10) Patent No.: US 8,632,321 B2
(45) Date of Patent: Jan. 21, 2014

(54) FULLY SUBMERGED INTEGRATED ELECTRIC OIL PUMP

(75) Inventors: Gil Hadar, Guelph (CA); Andy Bennett, Ontario (CA)

(73) Assignee: Magna Powertrain Inc., Concord (CA)

( * ) Notice: Subject to any disclaimer, the term of this patent is extended or adjusted under 35 U.S.C. 154(b) by 972 days.

(21) Appl. No.: 12/612,892

(22) Filed: Nov. 5, 2009

(65) Prior Publication Data

US 2010/0129239 A1    May 27, 2010

Related U.S. Application Data

(60) Provisional application No. 61/112,231, filed on Nov. 7, 2008.

(51) Int. Cl.
*F04B 17/00* (2006.01)
*F04B 35/04* (2006.01)

(52) U.S. Cl.
USPC ........................................ 417/410.4; 418/61.3

(58) Field of Classification Search
USPC ................ 417/410.4, 423.3, 423.14; 310/87;
418/61.3, 171, 166, 96, 132
See application file for complete search history.

(56) References Cited

U.S. PATENT DOCUMENTS

| | | | |
|---|---|---|---|
| 1,531,724 A * | 3/1925 | Arutunoff | 310/54 |
| 4,519,755 A | 5/1985 | Hanson | |
| 4,749,894 A * | 6/1988 | Iwata et al. | 310/87 |
| 5,034,638 A * | 7/1991 | McCabria | 310/54 |
| 5,145,329 A * | 9/1992 | Zumbusch et al. | 417/356 |
| 5,145,348 A | 9/1992 | Zumbusch | |
| 5,217,085 A | 6/1993 | Barrie et al. | |
| 5,219,277 A * | 6/1993 | Tuckey | 417/366 |
| 5,336,064 A | 8/1994 | Lamers | |
| 5,360,322 A | 11/1994 | Henein et al. | |
| 5,509,792 A * | 4/1996 | Sullivan et al. | 417/417 |
| 5,702,242 A | 12/1997 | Nied-Menninger et al. | |
| 5,743,231 A | 4/1998 | Reinosa | |
| 5,807,090 A | 9/1998 | Agner | |
| 5,975,868 A | 11/1999 | Agner | |
| 6,120,270 A | 9/2000 | Parsch | |
| 6,152,716 A | 11/2000 | Agner | |
| 6,164,928 A | 12/2000 | Agner | |
| 6,227,816 B1 | 5/2001 | Breuer et al. | |
| 6,234,775 B1 | 5/2001 | Agner et al. | |
| H1966 H * | 6/2001 | Henry et al. | 417/356 |
| 6,244,830 B1 | 6/2001 | Agner | |
| 6,349,692 B1 | 2/2002 | Reinosa | |
| 6,413,063 B1 | 7/2002 | Parsch et al. | |
| 6,485,277 B2 | 11/2002 | Agner et al. | |
| 6,561,155 B1 | 5/2003 | Williams | |

(Continued)

FOREIGN PATENT DOCUMENTS

WO    WO 2006129657 A1 * 12/2006

*Primary Examiner* — Devon Kramer
*Assistant Examiner* — Amene Bayou
(74) *Attorney, Agent, or Firm* — Harness, Dickey & Pierce, P.L.C.

(57) ABSTRACT

A submersible electric pump includes a housing adapted to be submerged within a fluid to be pumped having apertures extending therethrough. An electric motor stator is positioned within the housing in communication with the apertures and is adapted to be in contact with the fluid. Inner and outer pump rotors are positioned within the housing in meshed engagement with one another to pump fluid when rotated. A plurality of permanent magnets are fixed for rotation with the outer rotor.

15 Claims, 10 Drawing Sheets

(56) References Cited

U.S. PATENT DOCUMENTS

| | | |
|---|---|---|
| 6,579,013 B2 | 6/2003 | Gaio et al. |
| 6,879,078 B2 * | 4/2005 | Wolters ................. 310/216.074 |
| 6,896,489 B2 | 5/2005 | Hunter et al. |
| 7,018,178 B2 | 3/2006 | Hunter et al. |
| 7,156,623 B2 | 1/2007 | Sakakibara et al. |
| 7,314,352 B2 | 1/2008 | Nakayoshi et al. |
| 7,344,361 B2 | 3/2008 | Kiefer |
| 7,396,214 B2 | 7/2008 | Hunter et al. |
| 2004/0084979 A1 * | 5/2004 | Hughes et al. ................. 310/78 |
| 2005/0186089 A1 * | 8/2005 | Nakayoshi et al. ........... 417/355 |
| 2005/0206258 A1 * | 9/2005 | Gustafson et al. ............. 310/87 |
| 2008/0038117 A1 | 2/2008 | Armenio et al. |
| 2008/0069704 A1 | 3/2008 | Armenio et al. |
| 2008/0159885 A1 * | 7/2008 | Kameya et al. ........... 417/410.4 |

* cited by examiner

FULLY SUBMERGED INTEGRATED ELECTRIC OIL PUMP

CROSS-REFERENCE TO RELATED APPLICATIONS

This application claims the benefit of U.S. Provisional Application No. 61/112,231, filed on Nov. 7, 2008. The entire disclosure of the above application is incorporated herein by reference.

FIELD

The present disclosure generally relates to an electric motor driven pump. More particularly, a submersible integrated electric oil pump is described.

BACKGROUND

This section provides background information related to the present disclosure which is not necessarily prior art.

A number of electric pumps have been disclosed combining an electric motor and a gerotor pump. For example, U.S. Pat. No. 7,156,623 describes an electric motor and a gerotor pump that are usable separately or in combination with one another. While this concept may provide a pumping function, redundancies exist, possibly negatively effecting the cost, size and weight of the fluid pump.

In addition, U.S. Pat. No. 7,314,352 describes a pump having an integrated electric motor. The electric motor includes a stator having a core with a plurality of ring-shaped steel plates and a wire coil wound about the core. The plates and coil are encapsulated within a block of resin. Unfortunately, the resin spaces the stator apart from permanent magnets of the motor armature a distance greater than desired. Motor efficiency decreases as the distance between the stator and armature increases. Furthermore, use of the resin increases the challenge of controlling the end face clearances of the rotating components due to the difficulty of machining the resin. Accordingly, a need in the art exists for an improved fully submersible integrated electric oil pump.

SUMMARY

This section provides a general summary of the disclosure, and is not a comprehensive disclosure of its full scope or all of its features.

A submersible electric pump includes a housing adapted to be submerged within a fluid to be pumped having apertures extending therethrough. An electric motor stator is positioned within the housing in communication with the apertures and is adapted to be in contact with the fluid. Inner and outer pump rotors are positioned within the housing in meshed engagement with one another to pump fluid when rotated. A plurality of permanent magnets are fixed for rotation with the outer rotor.

In another form, a submersible electric pump includes a first shell having a substantially planar first pump surface and a second shell fixed to the first shell to define a housing. The second shell has a substantially planar second pump surface spaced apart from and extending substantially parallel to the first pump surface. A gerotor pump includes an inner rotor and an outer rotor. Each rotor includes opposite faces positioned adjacent the first and second pump surfaces. A rotor shaft includes spaced apart shoulders engaging each of the first and second shells to define a predetermined spacing between the first and second pump surfaces. An electric motor stator is positioned within the housing. Permanent magnets are fixed for rotation with the outer rotor and are positioned proximate the stator.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
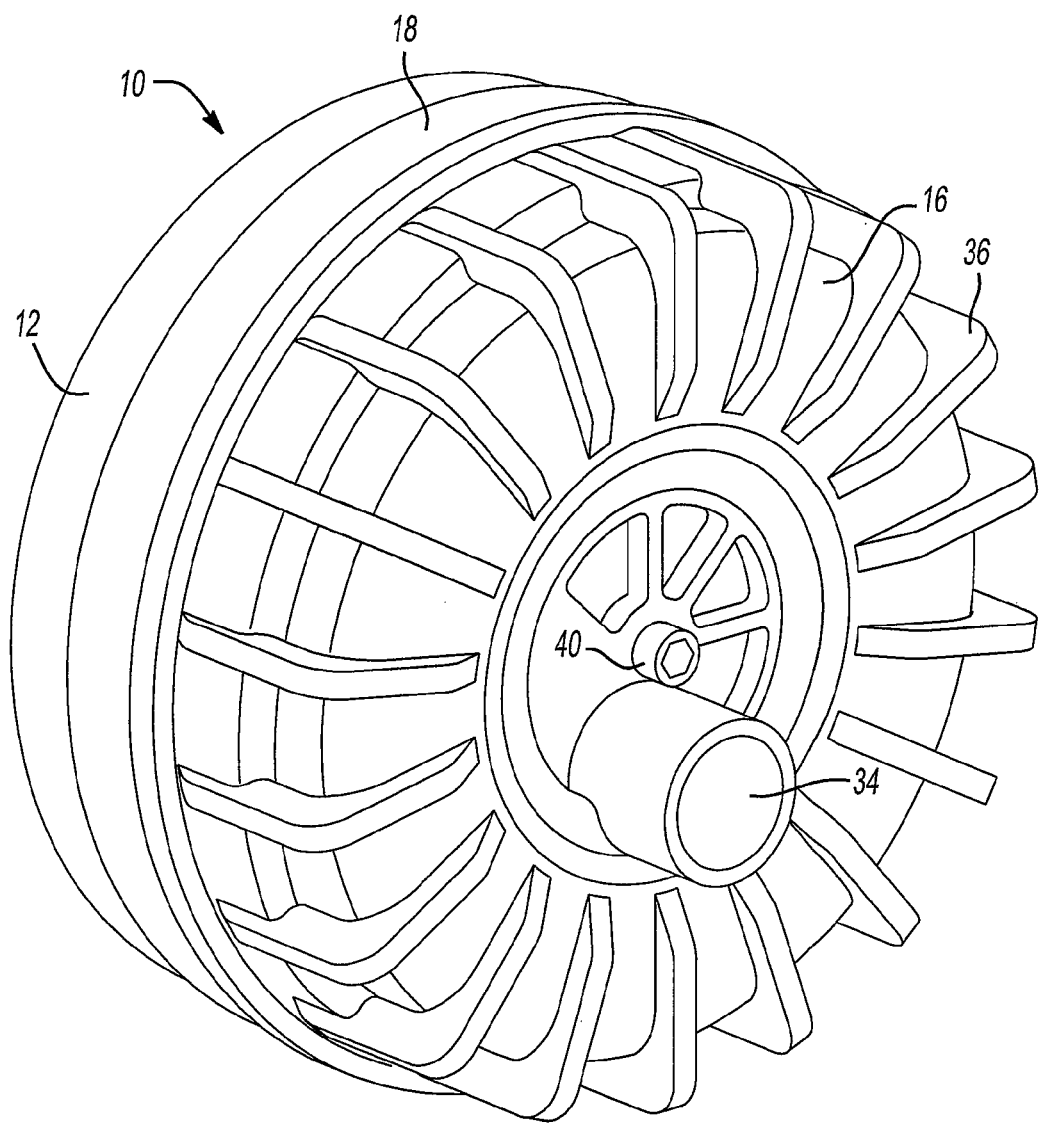
FIG. 1 is a perspective view of a submersible electric pump constructed in accordance with the teachings of the present disclosure.
Figure 2:
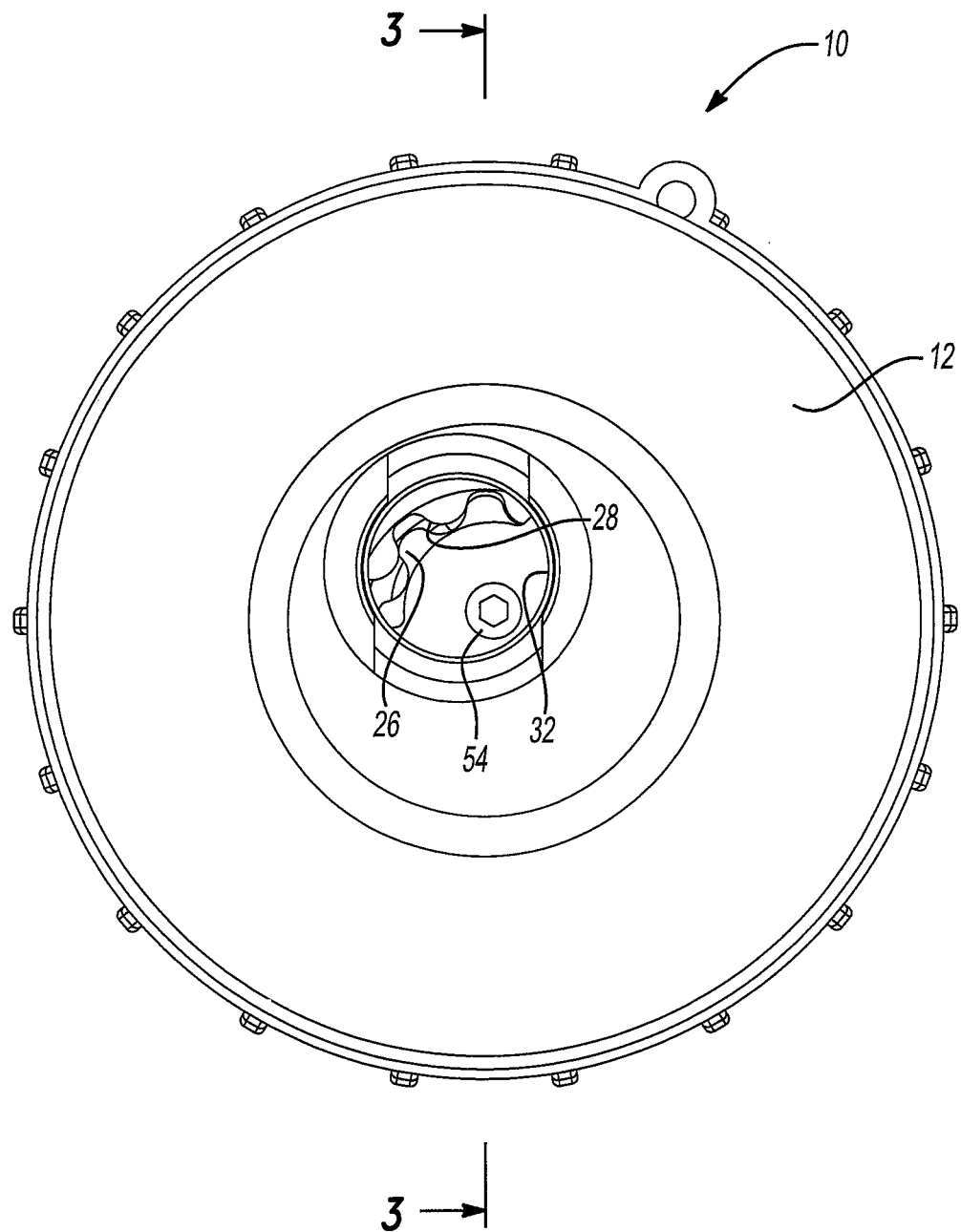
FIG. 2 is an end view of the submersible electric pump.
Figure 3:
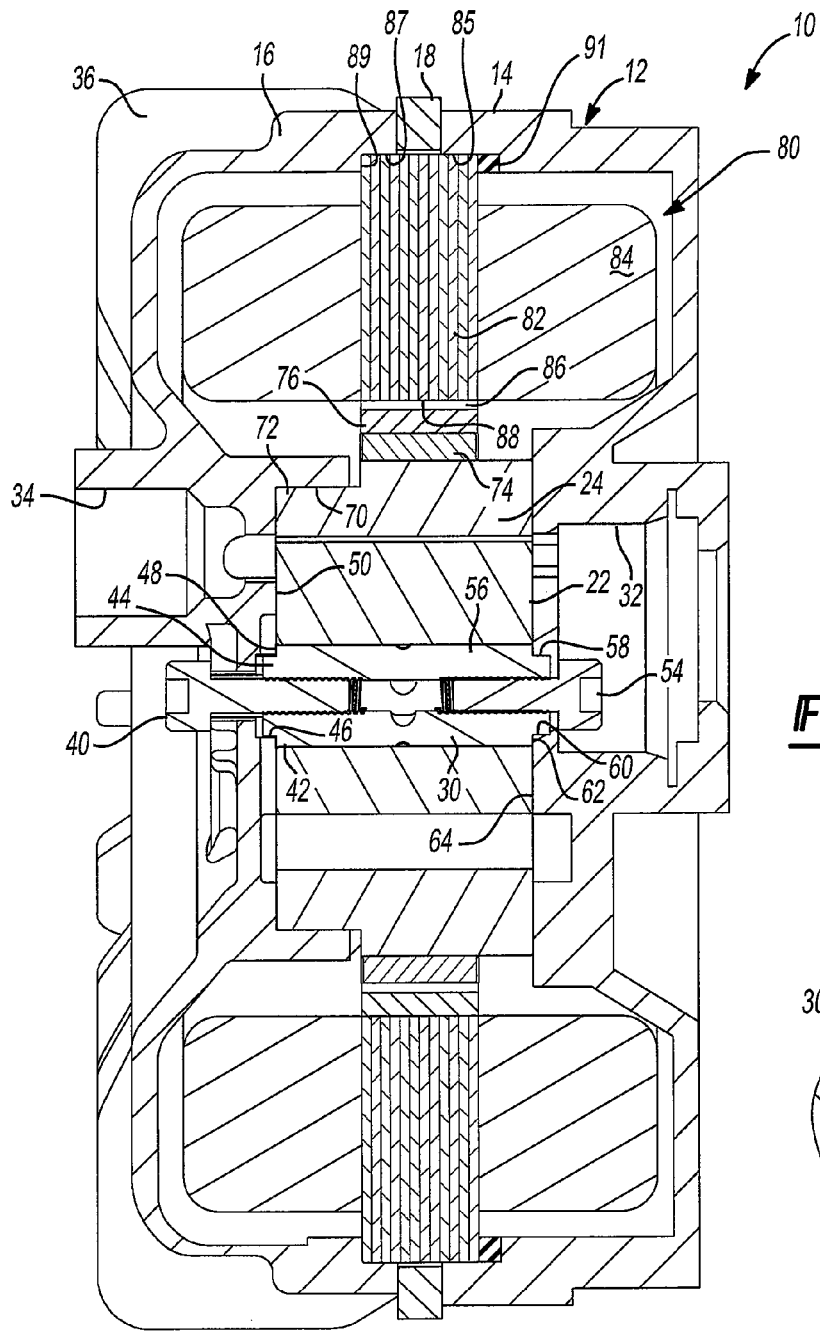
FIG. 3 is a cross-sectional view taken along line 3-3 as shown in FIG. 2.

FIGS. 1-3 depict a submersible integrated electric oil pump identified at reference numeral 10. Pump 10 includes a housing 12 having a base 14, a cover 16 and an intermediate ring 18. Each of base 14 and cover 16 may be formed as aluminum die castings. Intermediate ring 18 is sandwiched between base 14 and cover 16 to compensate for the coefficient of thermal expansion of housing 12 being different than the components within housing 12. Intermediate ring 18 is preferably constructed from a material having a coefficient of thermal expansion substantially less than that of aluminum. Intermediate ring 18 may be constructed from a powdered metal material to meet this goal. Base 14, cover 16 and intermediate ring 18 are fixed to one another along the perimeter of pump 10. Any number of fastening methods may be employed including screwing, crimping, clamping, riveting, welding, adhesive bonding or the like.

Electric oil pump 10 includes an inner rotor 22 and an outer rotor 24 in cooperation with one another to define a gerotor pump. Inner rotor 22 includes a plurality of outer lobes 26 in meshed engagement with a plurality of inner lobes 28 formed on outer rotor 24. Outer rotor 24 includes one more lobe than inner rotor 22. Furthermore, it should be appreciated that inner rotor 22 rotates about an axis defined by a stationary rotor shaft 30 that is offset from an axis of rotation about which outer rotor 24 rotates. An inlet port 32 is in communication with inner rotor 22 and outer rotor 24 at a location where a volume of space therebetween increases as inner rotor 22 rotates relative to outer rotor 24. Inlet port 32 extends through base 14.

An outlet port 34 is formed in cover 16 and positioned in communication with inner rotor 22 and outer rotor 24 at a location where pressurized fluid is output from the gerotor. Cover 16 also includes a plurality of monolithic fins 36 for increasing heat transfer between pump 10 and the fluid in which the pump is submerged.

A first fastener 40 fixes a first end 42 of rotor shaft 30 to cover 16. A reduced diameter portion 44 is formed at first end 42 and placed in communication with a first recess 46 formed in cover 16 to accurately position rotor shaft 30. First fastener 40 engages a first shoulder 48 of rotor shaft 30 with a first pump face 50 formed on cover 16.

In similar fashion, a second fastener 54 fixes a second end 56 of rotor shaft 30 to base 14. A stepped reduced diameter portion 58 is accurately positioned within a recess 60 formed in base 14. A second shoulder 62 is secured against a second pump face 64 formed on base 14. The distance between first shoulder 48 and second shoulder 62 is accurately controlled to define a running clearance between inner rotor 22, outer rotor 24, base 14 and cover 16. By fixing inner shaft 30 to base 14 and cover 16, the desired spacing between housing 12 and the moveable inner rotor 22 and outer rotor 24 is maintained throughout pump operation. Furthermore, fasteners 40, 54 restrict cover 16 and base 14 from moving away from inner and outer rotors 22, 24 while fluid forces are generated during pumping. Proper pump function is thereby maintained.

Figure 3A:
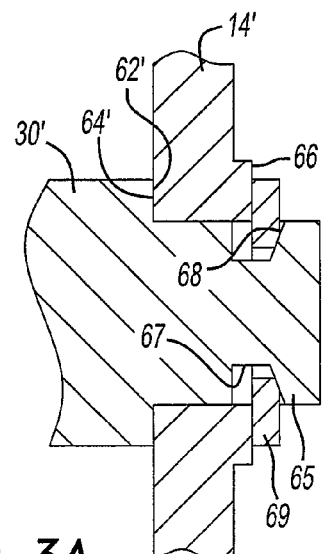
FIG. 3A is fragmentary cross-sectional view of an alternate rotor shaft retention method.

FIG. 3A depicts an alternate method of interconnecting rotor shaft 30 to base 14 and/or cover 16. An alternate rotor shaft 30' includes a reduced diameter portion 65 extending through base 14'. Base 14' includes a load face 66 spaced a predetermined distance from second pump face 64'. A ring groove 67 is formed on portion 65 and includes a tapered surface 68. A retaining clip 69 is placed in biased engagement with tapered surface 68 to load second pump face 64' against second shoulder 62' of rotor shaft 30'. Retaining clip 68 may also include a tapered surface in engagement with tapered surface 68.

A pocket 70 is formed within cover 16 to define the axis of rotation of outer rotor 24. Outer rotor 24 includes a hub portion 72 having a reduced outer diameter positioned within pocket 70. It is contemplated that inner rotor 22 and outer rotor 24 are each constructed from a powdered metal material. A back iron sleeve 74 is fixed for rotation with outer rotor 24. A plurality of magnets 76 are fixed for rotation with back iron sleeve 74. Magnets 76 are arranged in alternating polarity about the circumference of back iron sleeve 74.

A stator 80 includes a plurality of plates 82 encompassed by windings 84. Stator 80 is fixed to housing 12 and may not rotate relative thereto. Stator 80 is radially aligned by surfaces 85, 87 formed on base 14 and cover 16, respectively. A land 89 on cover 16 restricts stator 80 from axial movement. A flexible member 91 urges stator 80 toward land 89 but also allows stator 80 to move as thermal expansion of the components requires. A gap 86 is formed between an inner cylindrical surface 88 of stator 80 and magnets 76. The size of gap 86 is minimized through the use of rotor shaft 30, hub 72 and pocket 70. Furthermore, stator 80 is constructed to be in contact with the fluid to be pumped, if desired. Apertures may extend through each of base 14 and cover 16 to allow fluid flow through housing 12 and over stator 80 to provide a cooling function. Windings 84 are not encased within a molded shell and may be positioned very closely to permanent magnets 76. The efficiency of the motor increases as gap 86 is reduced. To maximize motor efficiency, the distance between permanent magnets 76 and a current carrying portion of stator 80 ranges from about 0.5 mm to 0.8 mm.

In operation, current is passed through windings 84 to generate a magnetic field. Permanent magnets 76 are urged to move thereby causing back iron sleeve 74, outer rotor 24 and inner rotor 22 to rotate. Pumping of fluid occurs at this time. As pumping continues, first fastener 40 and second fastener 54 restrict base 14 and cover 16 from spacing apart from one another and changing the distance between first pump surface 50 and second pump surface 64.

Figure 4:
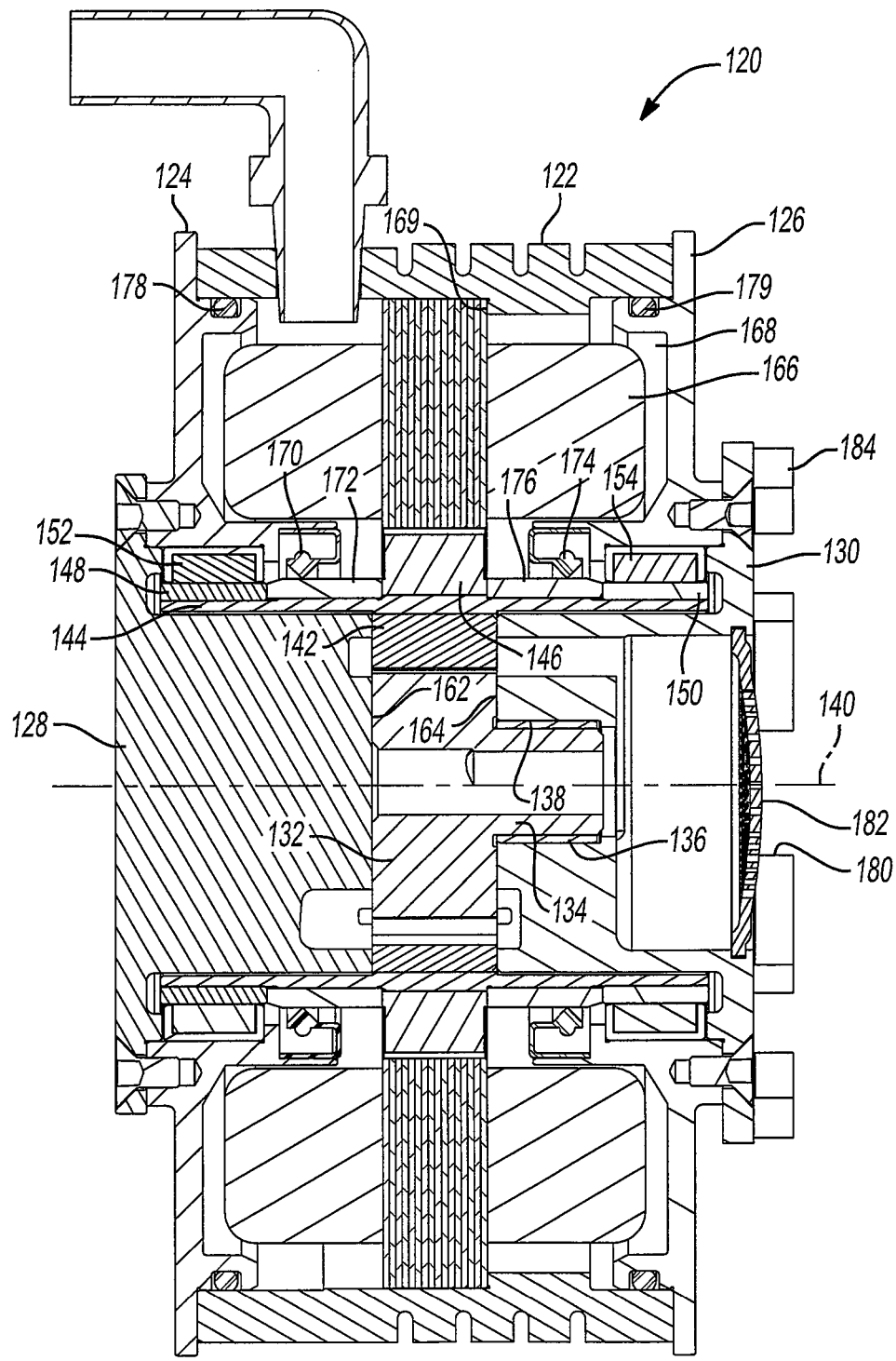
FIG. 4 is a cross-sectional view of an alternate submersible electric pump.
Figure 5:
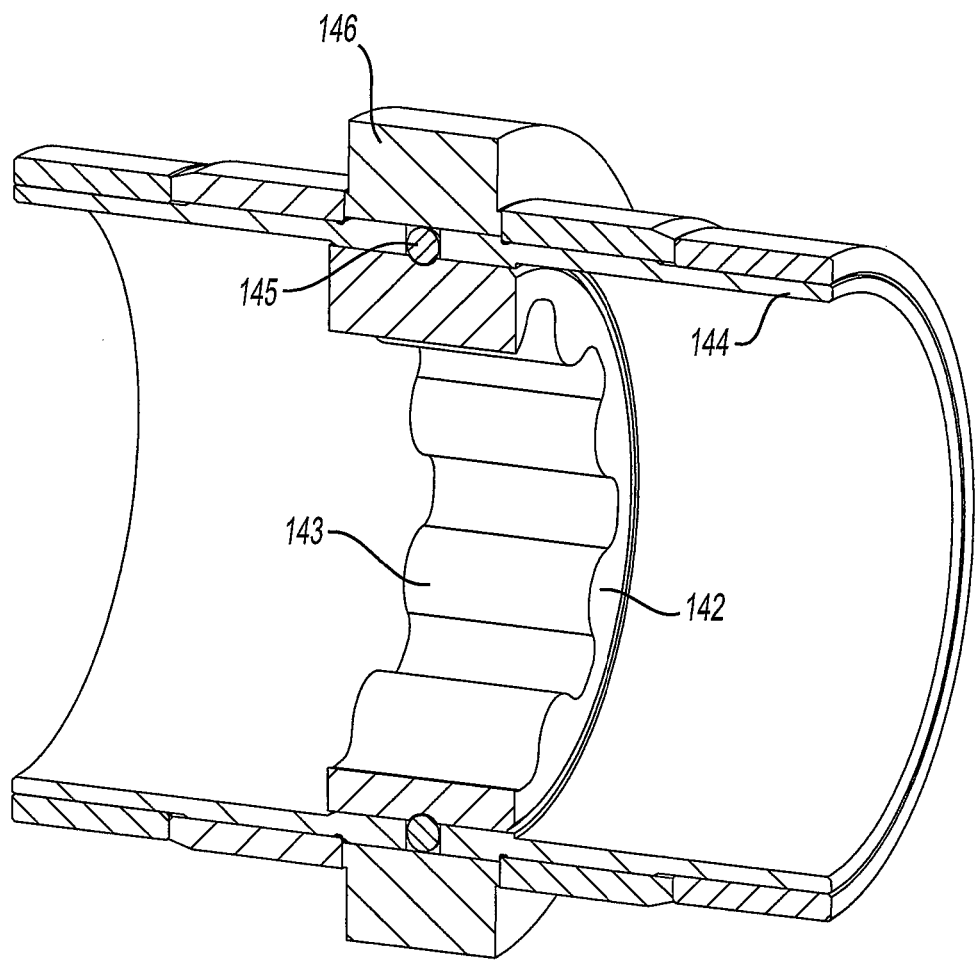
FIG. 5 is a sectional perspective view of a back iron sleeve, permanent magnet and outer rotor subassembly of the pump depicted in FIG. 4.

FIGS. 4 and 5 depict an alternate pump identified at reference numeral 120. Pump 120 is also an integrated electric oil pump that is fully submersible within a fluid to be pumped. Integrated electric oil pump 120 includes a cylindrically shaped body 122, a first side plate 124 and a second side plate 126. First and second covers 128, 130 sealingly engage first and second side plates 124, 126. An inner rotor 132 includes a hub 134 supported for rotation by a bushing 136 positioned within a cavity 138 formed in second cover 130. Inner rotor 132 rotates about an axis of rotation 140. An outer rotor 142 includes internal lobes 143 in meshed engagement with external lobes (not shown) formed on inner rotor 132 to define a gerotor pump as previously described. Outer rotor 142 rotates about an axis of rotation offset from axis 140.

A shaft 144 is fixed for rotation with outer rotor 142 via a plurality of balls 145. A plurality of permanent magnets 146 are fixed for rotation with shaft 144. Bearing rings 148 and 150 are also fixed for rotation with shaft 144. A bearing assembly 152 is mounted to first side plate 124 to rotatably support bearing ring 148. Similarly, another bearing assembly 154 is coupled to second side plate 126 to rotatably support bearing ring 150, shaft 144 and outer rotor 142.

First cover 128 includes a pump face 162 spaced apart from inner rotor 132 and outer rotor 142. A second pump surface 164 is formed at an end of second cover 130. Second pump surface 164 is spaced apart a predetermined distance from first pump surface 162 to provide a desired running clearance to inner rotor 132 and outer rotor 142. A stator 166 is positioned within a cavity 168 defined by body 122, first side plate 124 and second side plate 126. A ledge 169 is formed at an inner diameter of body 122 to locate and support stator 166. Stator 166 surrounds magnets 146 as previously described in relation to pump 10.

A lip seal 170 is coupled to first side plate 124 and sealingly engages a seal plate 172 fixed for rotation with shaft 144. Another lip seal 174 is coupled to second side plate 126 and engages another seal ring 176 fixed for rotation with shaft 144. O-rings 178, 179 seal the joints between first side plate 124, second side plate 126 and body 122.

An inlet port 180 is formed in second side plate 126. A strainer 182 allows fluid to pass therethrough but restricts entry of contaminants into the pump. A plurality of stands 184 extend from second cover 130 to space apart strainer 182 from a bottom of a sump containing the fluid to be pumped. Pump 120 is a sealed design where the fluid to be pumped and the fluid surrounding the pump is restricted from entry into cavity 168.

Figure 6:
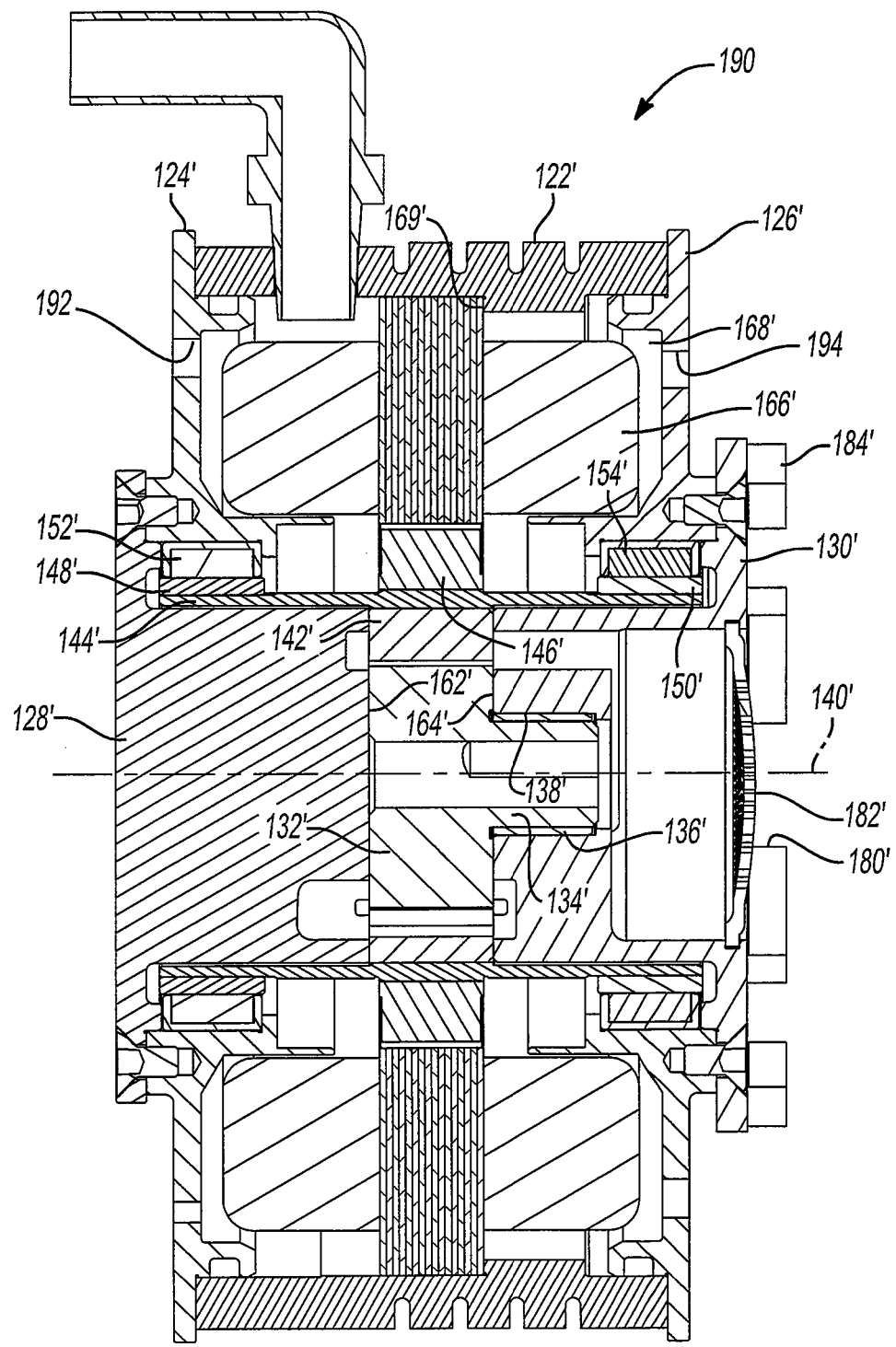
FIG. 6 is a cross-sectional view of another alternate submersible electric pump.

FIG. 6 depicts another submersible pump identified at reference numeral 190. Pump 190 is substantially similar to pump 120. Accordingly, similar elements will be identified with like numerals including a prime suffix. Pump 190 differs from pump 120 in that stator 166 is not sealed from the fluid to be pumped. On the contrary, cavity 168' is filled with oil when pump 190 is submerged within the fluid. A plurality of apertures 192 are formed in first side plate 124' to allow entry and exit of fluid. In similar fashion, a plurality of apertures 194 are formed in second side plate 126' to allow fluid communication with cavity 168'. Because sealing is no longer required, o-rings 178, 179 have been removed from pump 190. Furthermore, lip seals 170, 174, as well as seal rings 172 and 176 are no longer necessary. Associated machining of pockets or grooves to retain the seals is also not required even though the drawings may depict the presence of these features.

Figure 7:
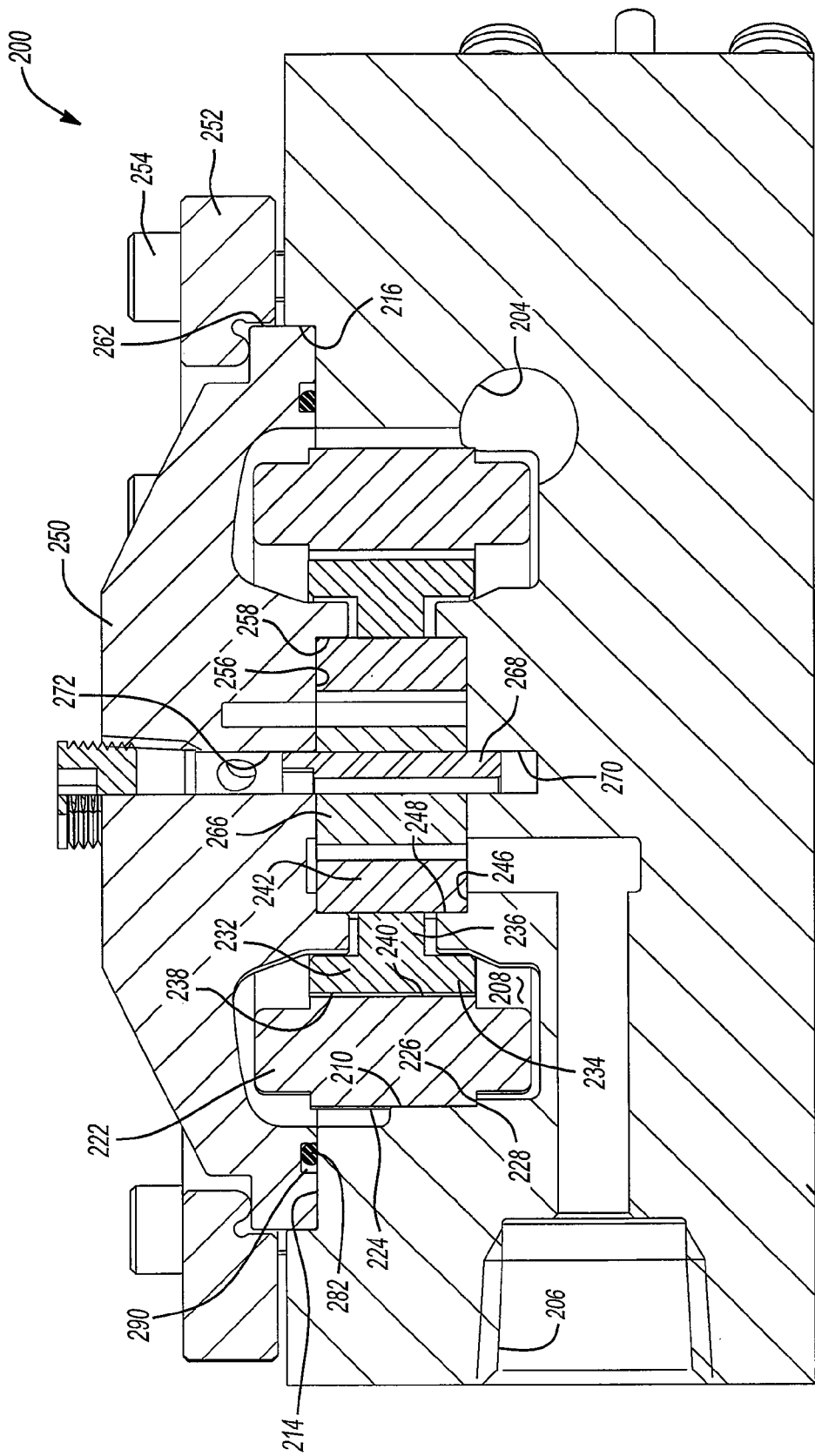
FIG. 7 is a cross-sectional view of another alternate submersible electric pump.
Figure 8:
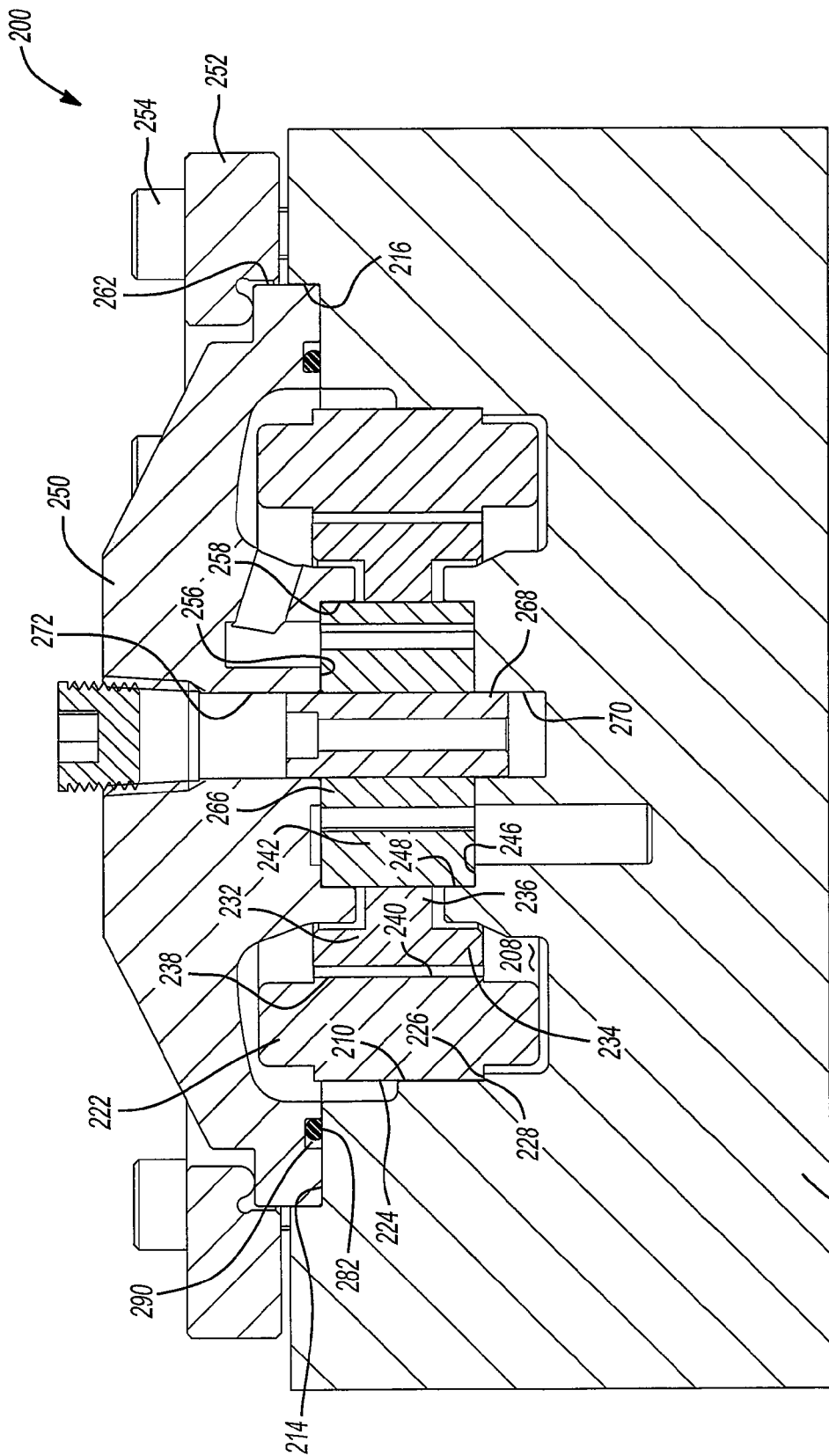
FIG. 8 is another cross-sectional view of a submersible electric pump.
Figure 9:
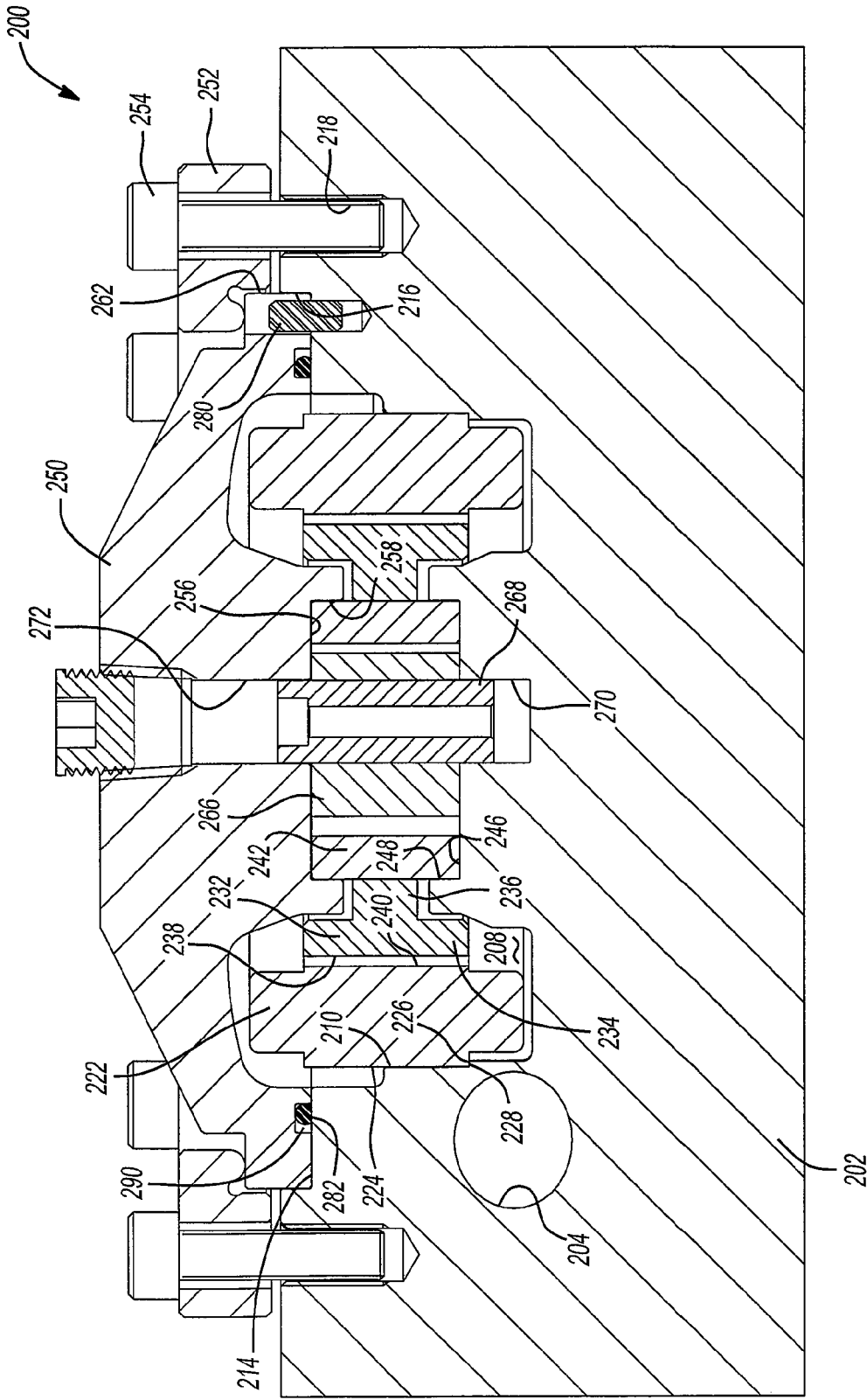
FIG. 9 is another cross-sectional view of a submersible electric pump.

FIGS. 7-9 depict another pump identified at reference numeral 200. Pump 200 is also configured as a submerged integrated electric oil pump. Pump 200 includes a housing 202 having a side wall 210. A recess 214 is defined by a substantially cylindrical wall 216. Threaded apertures 218 are circumferentially spaced apart from one another.

Pump 200 includes a stator 222 positioned within cavity a 208. Side wall 210 is sized to closely fit an outer surface 224 of stator 222 to restrict stator 222 from radial movement. A land 226 is formed on housing 202 to partially define cavity 208 and provide a seat for a surface 228 of stator 222 to restrict axial movement of the stator relative to housing 202.

A magnet ring 232 includes a substantially cylindrical portion 234 and a radially inwardly protruding portion 236. Magnet ring 232 includes a metallic backing ring portion and a plurality of magnets formed as one component. An outer substantially cylindrical surface 238 is spaced apart from an inner substantially cylindrical surface 240 of stator 222. An outer rotor 242 is fixed to magnet ring 232. Housing 202 includes a recess having a seat 246 surrounded by a substantially cylindrical wall 248. The seat 246 and cylindrical wall 248 are sized to clear the outer dimensions of outer rotor 242 but be closely positioned to the outer rotor to maintain a desired radial and axial position of outer rotor 242.

A cover 250 is fixed to housing 202 by a clamp ring 252 and fasteners 254. Cover 250 also defines a substantially planar surface 256 and a substantially cylindrical surface 258 that maintain the position of outer rotor 242. The alignment of cylindrical surfaces 258 and 248 is achieved by closely sizing an outer cylindrical surface 262 of cover 250 with cylindrical wall 216. An inner rotor 266 drivingly mates with outer rotor in similar fashion to that previously described with reference to rotor 22 and rotor 24. Inner rotor 266 is fixed to a center shaft 268. Inner rotor 266 and center shaft 268 are configured to rotate as a singular unit relative to housing 202 and cover 250. A bore 270 formed in housing 202 and a bore 272 formed in cover 250 receive ends of center shaft 268 and define its axis of rotation. Face 256 and seat 246 limit axial translation of inner rotor 266.

FIG. 9 depicts a dowel 280 positioned to assure accurate alignment and indexing of cover 250 relative to housing 202. A seal 282 is positioned within a groove 290 formed in cover 250 and engages recess 214.

Figure 10:
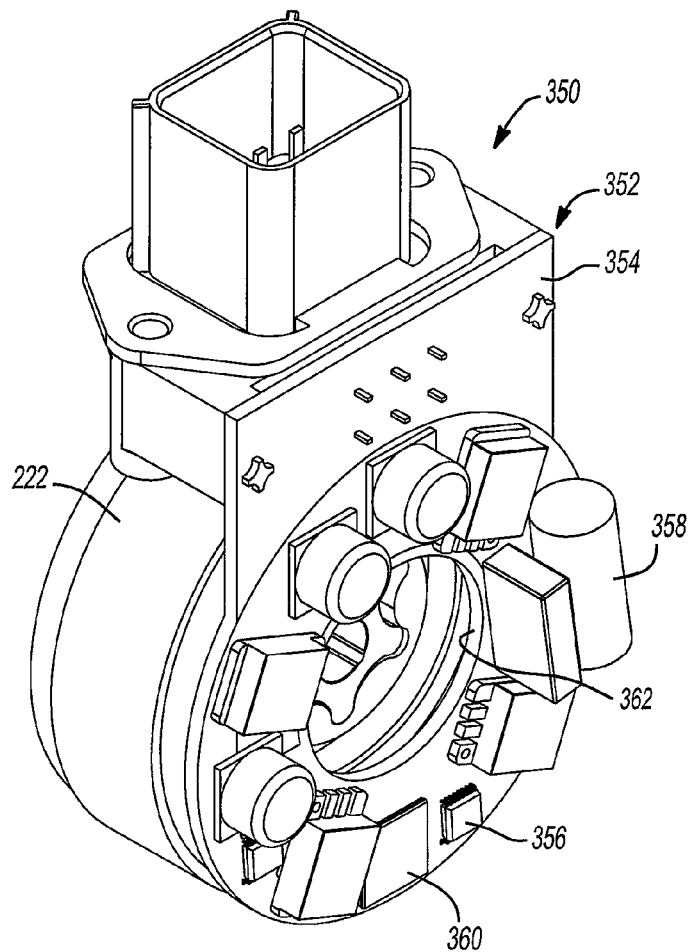
FIG. 10 is fragmentary perspective view of an alternate integrated electric pump including a ring-shaped controller.
Figure 11:
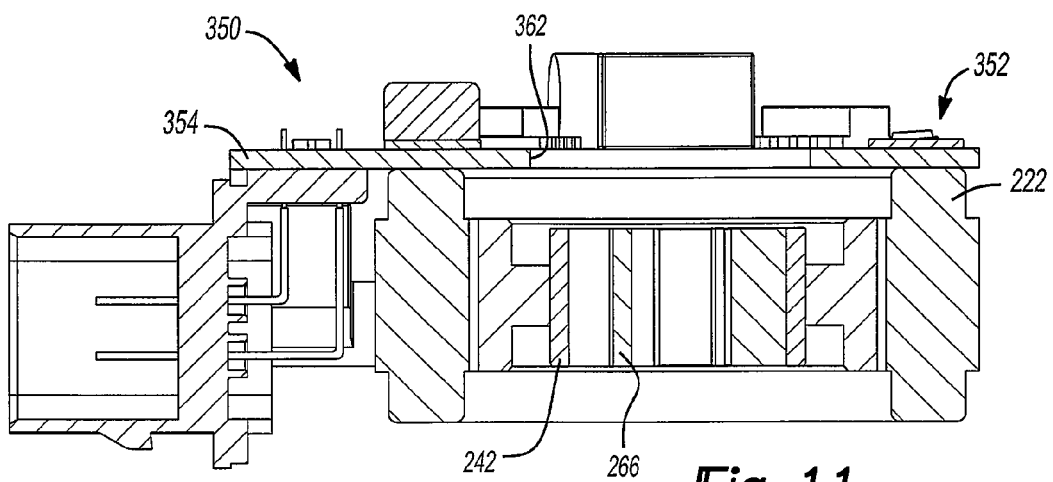
FIG. 11 is a sectional view of the pump depicted in FIG. 10.

FIGS. 10 and 11 depict a portion of an alternate pump identified at reference numeral 350. Pump 350 is substantially similar to pump 200 with the exception of a ring-shaped controller 352 being positioned adjacent stator 222. Controller 352 includes a board 354 positioned in engagement with stator 222. A number of electronic components including an integrated circuit 356, a capacitor 358 and a microprocessor 360 are fixed to board 354. Controller 352 is operable to control operation of pump 350. Board 354 and the components coupled thereto may be in communication with the fluid in which pump 350 is submersed. Based on the properties of the fluid to be pumped, controller 352 will function properly regardless of exposure to the fluid. A central aperture 362 extends through board 354. Central aperture 362 is sized and positioned to allow inner rotor 266 and outer rotor 242 to pass therethrough.

The output from board 354 is coupled to stator 222 such that electrical current is provided through the windings of stator 222 to create an electromagnetic field. Controller 352 may include an integrated circuit or integrated circuits operable to determine the current being provided to stator 222. Also, controller 352 may be operable to determine the torque applied to outer rotor 242.

In operation, pump 350 receives current from an external source. Energy is provided to controller 352 where a determination is made whether to provide current to stator 222. The magnitude of current to be provided to stator 222 is also determined. As the magnitude of current provided to stator 222 varies, the strength of the electromagnetic field surrounding stator 222 is also varied. The electromagnetic field interacts with magnet ring 232 causing outer rotor 242 to rotate. Because outer rotor 242 is in meshed engagement with inner rotor 266, the inner rotor 266 is also forced to rotate. Rotation of inner rotor 266 and outer rotor 242 causes a fluid pumping action.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A submersible electric pump comprising:
    a housing adapted to be submerged within a fluid to be pumped and having apertures extending therethrough;
    an electric motor stator positioned within the housing in communication with the apertures and adapted to be in contact with the fluid;
    inner and outer pump rotors positioned within the housing in meshed engagement with one another to pump fluid when rotated;
    a plurality of permanent magnets fixed for rotation with the outer rotor; and
    a back iron sleeve fixed for rotation with the permanent magnets and the outer rotor, wherein the back iron sleeve axially extends beyond the permanent magnets and is supported for rotation by a bearing.

2. The electric pump of claim 1 wherein the outer rotor includes a hub portion supported for rotation by the housing.

3. The electric pump of claim 1 further including a rotor shaft fixed to the housing and rotatably supporting the inner rotor.

4. The electric pump of claim 3 wherein the rotor shaft maintains a spacing between opposing housing walls at a location adjacent the inner rotor.

5. The electric pump of claim 3 further including a fastener interconnecting the housing and the rotor shaft.

6. The electric pump of claim 1 wherein a distance between the permanent magnets and a current carrying member of the stator ranges from 0.5 to 0.8 mm.

7. The electric pump of claim 1 wherein the inner rotor and outer rotor each rotate about spaced apart axes extending substantially parallel to each other.

8. The electric pump of claim 1 wherein the housing includes a radially inwardly extending ledge supporting the stator.

9. A submersible electric pump apparatus comprising:
- a first housing member including a first recess having a substantially planar first pump surface surrounded by a first wall;
- a second housing member fixed to the first housing member including a second recess having a substantially planar second pump surface surrounded by a second wall as well as being spaced apart from and extending substantially parallel to the first pump surface;
- a gerotor pump having an inner rotor and an outer rotor, each rotor having opposite faces positioned adjacent the first and second pump surfaces, the outer rotor being positioned within the first and second recesses and aligned on an axis of rotation by the first and second walls;
- a rotor shaft engaging each of the first and second housing members defining an inner rotor axis of rotation offset from the outer rotor axis of rotation;
- an electric motor stator positioned within a pocket formed in the second housing member; and
- a plurality of permanent magnets fixed for rotation with the outer rotor, the magnets being positioned proximate the stator.

10. The submersible electric pumping apparatus of claim 9 wherein the rotor shaft is fixed for rotation with the inner rotor.

11. The submersible electric pumping apparatus of claim 10 wherein the stator engages a land and a side wall of the second housing member.

12. The submersible electric pumping apparatus of claim 9 further including a magnet ring including a radially extending portion fixed to the outer rotor, wherein the magnets are fixed to the magnet ring.

13. The submersible electric pumping apparatus of claim 12 wherein the magnet ring includes a cylindrically shaped portion surrounding the radially extending portion to define a T-shaped cross section.

14. The submersible electric pumping apparatus of claim 9 further including a motor controller coupled to the stator.

15. The submersible electric pumping apparatus of claim 14 wherein the motor controller includes a cylindrically shaped board having electronic components mounted thereon, the board having an aperture extending therethrough to provide a passageway for the inner and outer rotors to pass.

* * * * *